(12) United States Patent
Hayata

(10) Patent No.: US 7,431,338 B2
(45) Date of Patent: Oct. 7, 2008

(54) IMPACT ABSORBING KNEE BOLSTER

(75) Inventor: Keigo Hayata, Sano (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 11/780,706

(22) Filed: Jul. 20, 2007

(65) Prior Publication Data
US 2008/0048425 A1 Feb. 28, 2008

(30) Foreign Application Priority Data
Aug. 25, 2006 (JP) ............................. 2006-228819

(51) Int. Cl.
*B60R 21/045* (2006.01)
(52) U.S. Cl. ..................................... 280/752
(58) Field of Classification Search ................. 280/752, 280/751, 748
See application file for complete search history.

(56) References Cited
U.S. PATENT DOCUMENTS

| 3,930,665 | A | * | 1/1976 | Ikawa | 280/751 |
| 5,518,270 | A | * | 5/1996 | Hanada et al. | 280/751 |
| 6,702,324 | B2 | * | 3/2004 | Shimoyamada et al. | 280/752 |
| 2003/0071448 | A1 | * | 4/2003 | Shimoyamada et al. | 280/752 |
| 2007/0222197 | A1 | * | 9/2007 | Makita et al. | 280/752 |

FOREIGN PATENT DOCUMENTS

| JP | H04-70556 U | 6/1992 |
| JP | H07-267026 A | 10/1995 |

* cited by examiner

*Primary Examiner*—Faye M. Fleming
(74) *Attorney, Agent, or Firm*—Global IP Counselors, LLP

(57) ABSTRACT

An impact absorbing knee bolster is provided with an impact absorbing structure and a knee bolster main body plate. The impact absorbing structure includes a pair of upper brackets having a first impact deformation load threshold and a pair of lower brackets having a second impact deformation load threshold that is lower than the first impact deformation load threshold. The knee bolster main body plate includes bracket attachment parts contacting the upper and lower brackets with a prescribed gap formed between rear end parts of the upper and lower brackets. The knee bolster main body plate includes a deformation load reducing structure at a location adjacent at least one of the bracket attachment portion to reduce an impact deformation load threshold of the knee bolster main body plate so that a resulting receiving reaction force of the impact absorbing knee bolster is reduced when the lower brackets are deformed.

11 Claims, 5 Drawing Sheets

IMPACT ABSORBING KNEE BOLSTER

CROSS-REFERENCE TO RELATED APPLICATIONS

This application claims priority to Japanese Patent Application No. 2006-228819, filed on Aug. 25, 2006. The entire disclosure of Japanese Patent Application No. 2006-228819 is hereby incorporated herein by reference.

BACKGROUND OF THE INVENTION

1. Field of the Invention

The present invention generally relates to an impact absorbing knee bolster. More specifically, the present invention relates to an impact absorbing knee bolster that can more precisely absorb an impact from passengers with different body types.

2. Background Information

An instrument panel is provided to a front part of a vehicle interior in an automotive or other vehicle. Sometimes the instrument panel is provided with a knee bolster face the knees of a passenger. The knee bolster is typically mounted to absorb the impact energy of the passenger's knees in the event that the passenger's knees impacts against the knee bolster. An embodiment of a conventional knee bolster is disclosed in Japanese Laid-Open Patent Application No. 7-267026.

In view of the above, it will be apparent to those skilled in the art from this disclosure that there exists a need for an improved impact absorbing knee bolster. This invention addresses this need in the art as well as other needs, which will become apparent to those skilled in the art from this disclosure.

SUMMARY OF THE INVENTION

It has been discovered that in some knee bolsters, such as disclosed in Japanese Laid-Open Patent Application No. 7-267026, the knee bolster may not optimally absorb the impact energy from the passenger's knees for a wide range of body sizes. The below-described configuration has been developed in order to enable such a body-type-responsive function.

It is an object to optimize the body-type-responsive function of an impact absorbing knee bolster more precisely. In order to achieve this object, the receiving reaction force relating to the knees of a vehicle occupant of a smaller body type must be made smaller than the prevailing state, while the receiving reaction force relating to the knees of a vehicle occupant of an average body type is left substantially unaffected.

In view of this situation, according to one aspect of the present invention an impact absorbing bracket is provided that basically comprises an impact absorbing structure and a knee bolster main body plate. The impact absorbing structure is configured and arranged to be attached to a vehicle structural member. The impact absorbing structure includes a pair of upper impact absorbing brackets having a first impact deformation load threshold and a pair of lower impact absorbing brackets having a second impact deformation load threshold that is lower than the first impact deformation load threshold. The knee bolster main body plate includes a pair of bracket attachment parts contacting rear end parts of the upper and lower impact absorbing brackets with a prescribed gap formed between the rear end parts of the upper and lower impact absorbing brackets. The knee bolster main body plate further includes a deformation load reducing structure configured and arranged at a location adjacent at least one of the bracket attachment portion to reduce an impact deformation load threshold of the knee bolster main body plate so that a resulting receiving reaction force of the impact absorbing knee bolster is reduced when the lower impact absorbing brackets are deformed.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
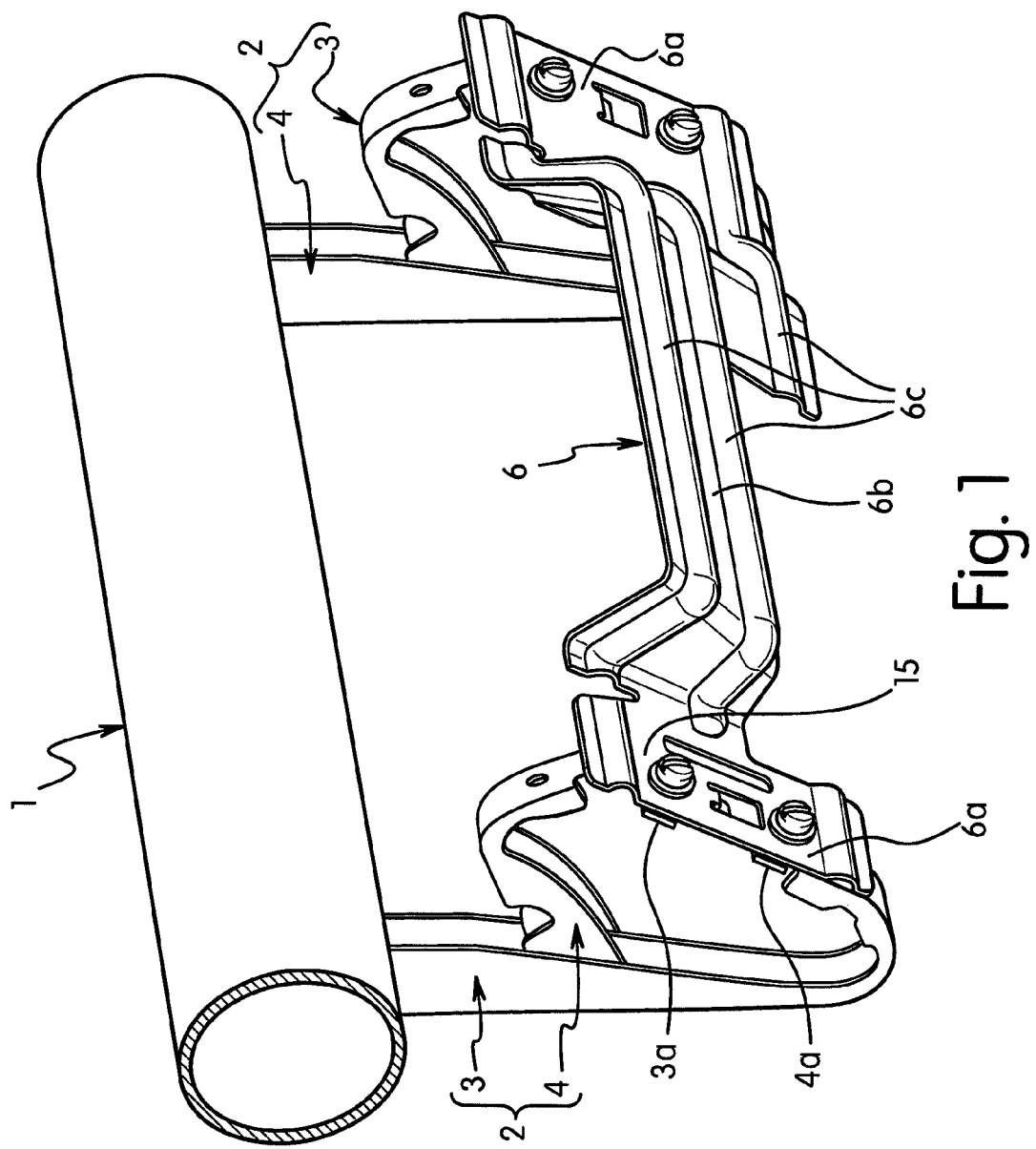
FIG. 1 is a perspective view of an impact absorbing knee bolster in accordance with a first embodiment of the present invention.
Figure 2:
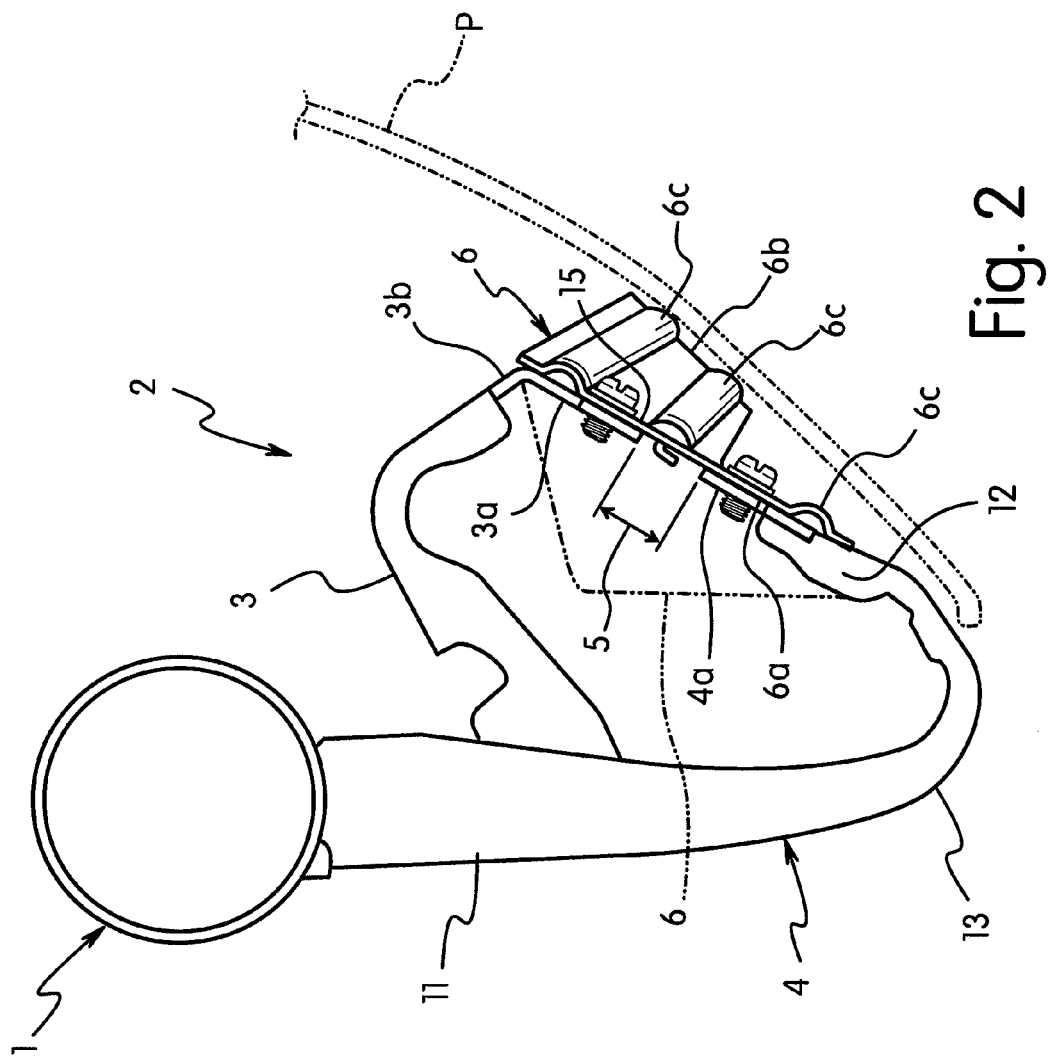
FIG. 2 is a side elevational view of the impact absorbing knee bolster illustrated in FIG. 1.

Referring initially to FIGS. 1 and 2, an impact absorbing knee bolster is illustrated in accordance with a first embodiment of the present invention. The impact absorbing knee bolster is fixedly attached to a vehicle structural member 1, which extends in a widthwise (lateral) direction of the vehicle behind an instrument panel 3. The vehicle structural member 1 is a strengthening member that connects the left and right vehicle body panels. The vehicle side member 1 supports, e.g., a steering column, and is thereby used as a steering support member or the like. The impact absorbing knee bolster is also concealed behind the instrument panel P as seen in FIG. 2. The instrument panel P forms a front part of a vehicle interior in the vehicle. The impact absorbing knee bolster is typically installed on the driver's side of the instrument panel P for a vehicle occupant seated in a driver's seat.

The steering column (not shown) passes through the instrument panel P in front of the driver's seat. A steering wheel (not shown) is mounted to a rearward end of the steering column. The steering column 4 is mounted to the vehicle structural member 1 and extends outwardly relative to the instrument panel P. When the impact absorbing knee bolster is installed on the driver's side of the instrument panel P, the impact absorbing knee bolster extends laterally across the steering column so that the impact absorbing knee bolster is located between the steering column and the passenger.

Preferably, the impact absorbing knee bolster includes a pair of impact absorbing structures 2 that can absorb energy acting upon the passenger's knees when the passenger's knees impact the instrument panel P. The impact absorbing structures 2 are preferably fixedly attached to the vehicle structural member 1 so that one of the impact absorbing structures 2 is located to be impacted by a left passenger's knee and the other of the impact absorbing structures 2 is located to be impacted by a right passenger's knee. Thus, in the case of the impact absorbing structure being installed on the driver's side of the instrument panel P, one of the impact absorbing structures 2 is located on each side of the steering column.

Each of the impact absorbing structures 2 basically includes a pair of upper impact absorbing brackets 3, a pair lower impact absorbing brackets 4 and a knee bolster main body plate 6. The upper impact absorbing brackets 3 are configured and arranged to primarily absorb the impact energy from a knee of a passenger with an average body type. The lower impact absorbing brackets 4 are configured and arranged to primarily absorb the impact energy from a knee of a passenger with a smaller than the average body type. The impact absorbing brackets 3 and 4 are separate in function and structure. The "average body type" as used to herein refers to a standard that is used to represent an average person such as, for example, the 50th percentile adult male set forth in the Federal Motor Vehicle Safety Standard (FMVSS). The "smaller body type" as used to herein refers to a standard that is used to represent an smaller than average person such as, for example, any standard below the 50th percentile adult male set forth in the Federal Motor Vehicle Safety Standard (FMVSS), e.g., the $5^{th}$ percentile adult female.

The upper impact absorbing brackets 3 are disposed in a vertical alignment the lower impact absorbing brackets 4, respectively, with the upper impact absorbing brackets 3 on an upper side and the lower impact absorbing brackets 4 on a lower side. In other words, the upper impact absorbing bracket 3 on the right side is vertical aligned with the lower impact absorbing bracket 4 on the right side, while the upper impact absorbing bracket 3 on the left side is vertical aligned with the lower impact absorbing bracket 4 on the left side.

Figure 3:
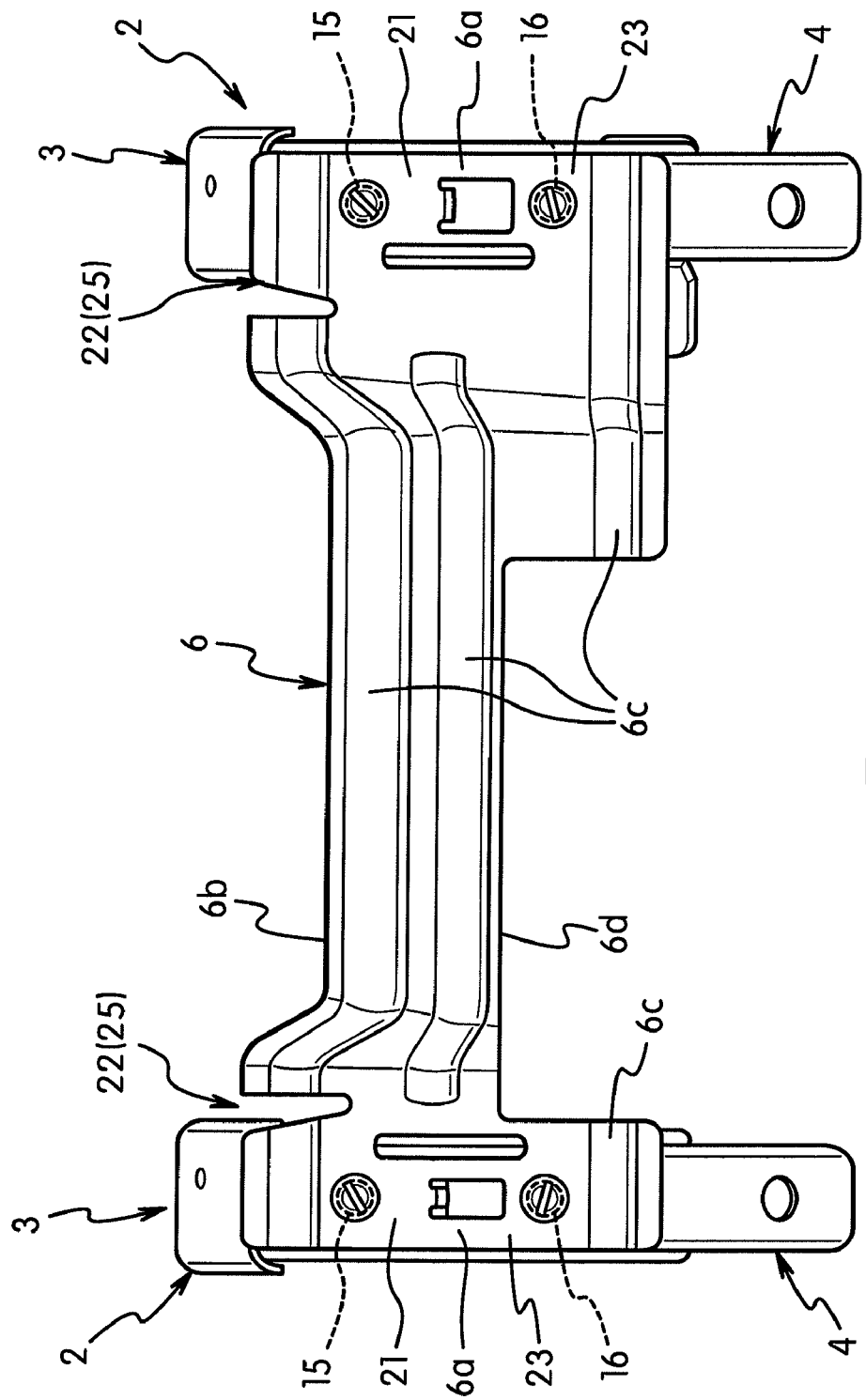
FIG. 3 is a front elevational view of the impact absorbing knee bolster illustrated in FIGS. 1 and 2.

As best seen in FIG. 3, the knee bolster main body plate 6 includes a pair of attachment mounting parts 6a and an expanding part 6b extending horizontally between the attachment mounting parts 6a. The knee bolster main body plate 6 is fixedly attached to the impact absorbing brackets 3 and 4 by the attachment mounting parts 6a. In particular, each of the upper impact absorbing brackets 3 has a rear end part 3a attached directly to the frontward facing side of one of the attachment mounting parts 6a of the knee bolster main body plate 6. Similarly, each of the lower impact absorbing brackets 4 has a rear end part 4a attached directly to the frontward facing side of one of the attachment mounting parts 6a of the knee bolster main body plate 6. Thus, the knee bolster main body plate 6 vertically connects the upper and lower impact absorbing brackets 3 and 4 with a predetermined vertical gap 5 formed between the rear end parts 3a and 4a of the upper and lower impact absorbing brackets 3 and 4.

The knee bolster main body plate 6 is a metal plate of the prescribed size and strength to enable the left and right impact absorbing structures 2 to absorb the impact energy of a passenger's knee. The knee bolster main body plate 6 is provided with one or more reinforcing bead parts 6c that extends in a transverse direction. Preferably, three of the reinforcing bead parts 6c are provides such that they project rearwardly. Preferably, the reinforcing bead parts 6c are formed on an upper edge portion, a lower edge portion, an intermediate edge portion, or the like on the knee protecting main body plate 6.

When the passenger's knees impacts the instrument panel P, the knee bolster main body plate 6 provided behind the instrument panel P receives the impact force from the passenger's knees, and the impact absorbing structures 2 collapse, whereby the energy acting upon the impact absorbing structures 2 from the passenger's knees is absorbed. When the passenger is of an average body type, the passenger's knees come into contact with a position high on the knee bolster main body blade 6. Therefore, the upper impact absorbing brackets 3 primarily collapse. However, the lower impact absorbing brackets 4 also collapse, but not as much as the upper impact absorbing brackets 3. Thus, the resulting receiving reaction force is thereby increased. Conversely, when the passenger is of a smaller body type, the passenger's knees come into contact with a position lower on the knee bolster main body plate 6. Therefore, the lower impact absorbing brackets 4 primarily collapse, and the resulting receiving reaction force is thereby made smaller. Thus, the upper and lower impact absorbing brackets 3 and 4 are used differently, such that the resulting receiving reaction force can be optimized in accordance with the body type. In other words, a body-type-responsive function can be realized.

As best seen in FIG. 2, each of the lower impact absorbing brackets 4 basically includes a lower bracket main body part 11, a knee receiving part 12 and a bent part 13. The lower bracket main body part 11 extends substantially downward from the vehicle structural member 1. The knee receiving part 12 extends substantially rearward of the vehicle body and diagonally upward from a lower end part of the lower bracket main body 11 so as to turn upward. The bent part 13 is disposed between these two parts, whereby a substantially sickle-shape or reverse "J" shape is formed in a side elevational view, as shown in FIG. 2. A front end part of each of the lower impact absorbing brackets 4 is anchored to the vehicle main body-side member 1. In other words, an upper end part of each of the lower bracket main body parts 11 is welded to a lower half part of the vehicle structural member 1. The lower bracket main body parts 11 are configured and arranged with a relatively high strength, while the knee receiving parts 12 and the bent parts 13 are configured and arranged with a relatively low strength as compared with the lower bracket main body parts 11. The knee receiving parts 12 are angled to substantially match a shape of a lower part of the instrument panel P.

As best seen in FIG. 2, each of the upper impact absorbing brackets 3 are provided substantially facing rearward of the vehicle body from a position on the upper side of a corresponding one of the lower bracket main body parts 11. The front end parts of the upper impact absorbing brackets 3 are welded and fixed in place adjacent to the upper end parts of the lower bracket main body parts 11.

The upper and lower impact absorbing brackets 3 and 4 are formed by bending metal plate materials into a three-sided square shape having a pair of flange parts connected by a central part. The upper and lower impact absorbing brackets 3 and 4 are disposed such that the open sides of these three-sided square shapes face one another. The widths of flange parts on both sides of the three-sided square shapes in the upper and lower impact absorbing brackets 3 and 4 are set and adjusted so that the receiving reaction force will be optimized. This is achieved by modifying or cutting away certain portions of the flange parts, and bending or removing material from the central parts between the flange parts.

Preferably, the entire body of the knee bolster main body plate 6 is tilted rearward to match the angle of the knee receiving parts 12 of the lower impact absorbing brackets 4. For this reason, the rear end parts 3a of the upper impact absorbing brackets 3 are substantially oriented downward and angled diagonally by the bent parts 3b in relation to other parts. Thus, the rear end parts 3a of the upper impact absorbing brackets 3 are disposed substantially as an extension of the rear end parts 4a of the lower impact absorbing brackets 4, respectively. Therefore, the rear end parts 3a of the upper impact absorbing brackets 3 and the rear end parts 4a of the lower impact absorbing brackets 4 face each other with the predetermined vertical gap 5 formed between the rear end parts 3a and 4a. The rear end parts 3a of the upper impact absorbing brackets 3 (the front portions starting from the bent parts 3b) and the rear end parts 4a of the lower impact absorbing brackets 4 are substantially rectangular attachment mountings with prescribed widths and lengths as need and/or desired.

As mentioned above, the attachment mounting parts 6a are configured and arranged for attaching the impact absorbing structures 2, respectively. Preferably, the lateral spacing of the attachment mounting parts 6a is such that the impact absorbing structures 2 are disposed in areas that basically correspond to the passenger's knees. Preferably, the attachment mounting parts 6a have widths that are equal to or greater than the widths of the rear end parts 3a of the upper impact absorbing brackets 3 and the widths of the rear end parts 4a of the lower impact absorbing brackets 4. The rear end parts 3a of the upper impact absorbing brackets 3 are anchored to an upper part of one of the attachment mounting parts 6a of the knee bolster main body plate 6. The rear end parts 4a of the lower impact absorbing brackets 4 are anchored to a lower part of one of the attachment mounting parts 6a of the knee bolster main body plate 6. In the illustrated embodiment, the attachment mounting parts 6a are provided with a pair of bolt holes 15 and 16, which are illustrated as an example of anchoring structures for fixedly securing each of the rear end parts 3a and 4a to one of the attachment mounting parts 6a. In particular, the upper bolt holes 15 are screw anchoring parts that are formed at corresponding positions between the rear end parts 3a of the upper impact absorbing bracket 3 and upper parts of the attachment mounting parts 6a of the knee bolster main body plate 6, while the lower bolt holes 15 are screw anchoring parts that are formed at corresponding positions between the rear end parts 4a of the lower impact absorbing brackets 4 and lower parts of the attachment mounting parts 6a of the knee bolster main body plate 6. The bolt holes 15 and 16 are provided substantially at center portions of the rear end parts 3a of the upper impact absorbing brackets 3 and the rear end parts 4a of the lower impact absorbing brackets 4.

The expanding part 6b of the knee bolster main body plate 6 expands rearward at a central portion of the knee bolster main body plate 6 that is located between the attachment mounting parts 6a of the knee bolster main body plate 6. The expanding part 6b is mainly used to circumvent the steering column.

The reinforcing bead parts 6c extend in a transverse direction and project in a rearward direction of the vehicle. Preferably, the reinforcing bead parts 6c are formed on an upper edge portion, a lower edge portion, an intermediate edge portion, or the like on the knee protecting main body plate 6. In FIG. 3, a relatively large cutout 6d is formed on a lower part of a center portion of the knee bolster main body plate 6. This large cutout 6d has a lateral width that is greater than or equal to one-half of the width of the knee bolster main body plate 6, and has a height that is less than or equal to one-half of the height of the knee bolster main body plate 6. The knee bolster main body plate 6 is formed, for example, by press working a metal plate material.

Figure 4:
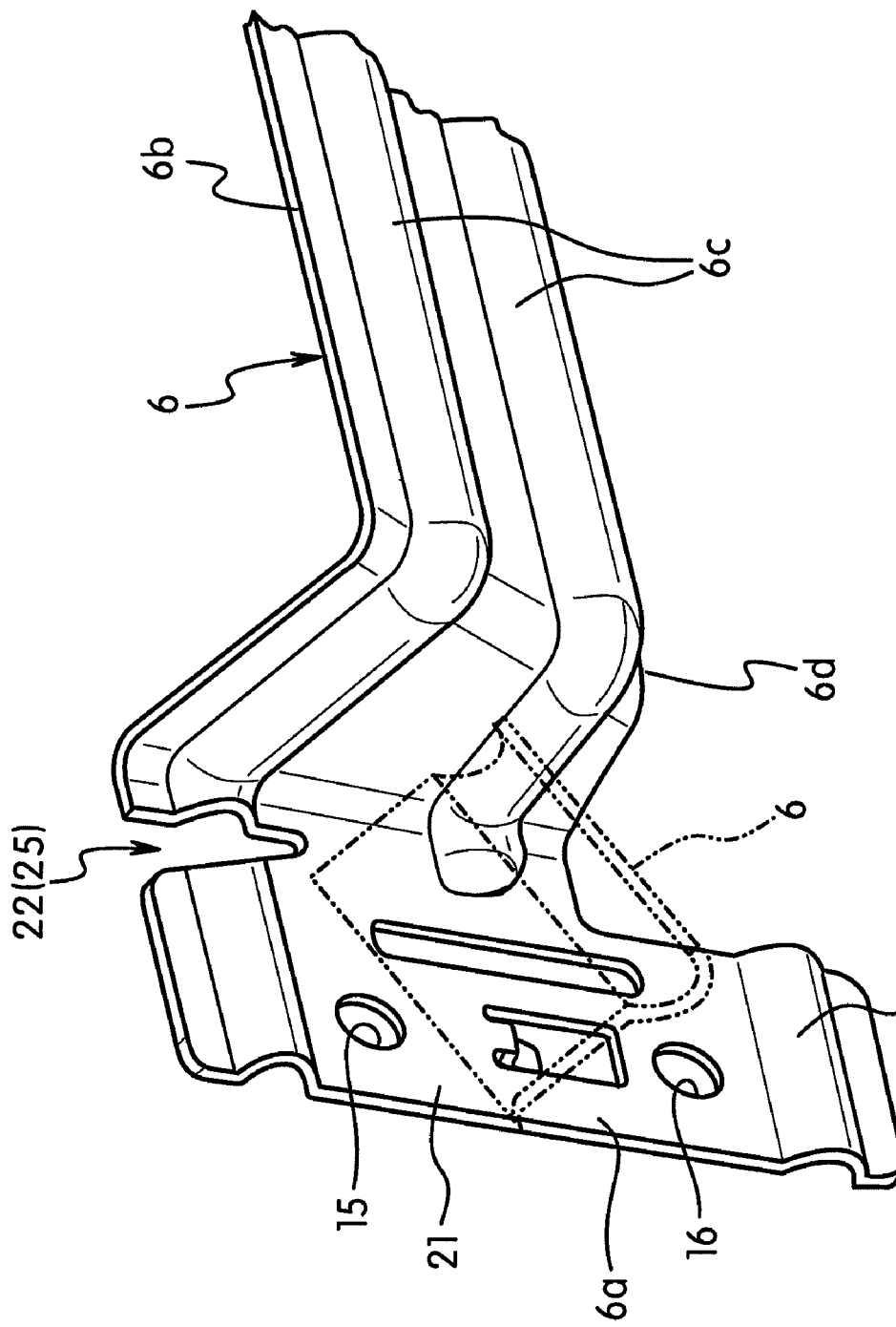
FIG. 4 is a partial enlarged perspective view of one end of the knee bolster main body plate of the impact absorbing knee bolster illustrated in FIG. 1.

In addition to the above-described basic configuration, in the impact absorbing knee bolster of the illustrated embodiment, the knee bolster main body plate 6 is provided with a deformation load reducing structure 22 formed adjacent to each of the attachment mounting parts 6a. In particular, the deformation load reducing structures 22 are formed at side parts (inside part) of the knee bolster main body plate 6 at upper bracket attachment portions 21 (i.e., the upper parts of the attachment mounting parts 6a) for the rear end parts 3a of the upper impact absorbing brackets 3, as shown in FIGS. 3 and 4. The deformation load reducing structures 22 are configured and arranged to reduce a deformation load on the knee bolster main body plate 6 when one or both of the lower impact absorbing brackets 4 is deformed.

Figure 5:
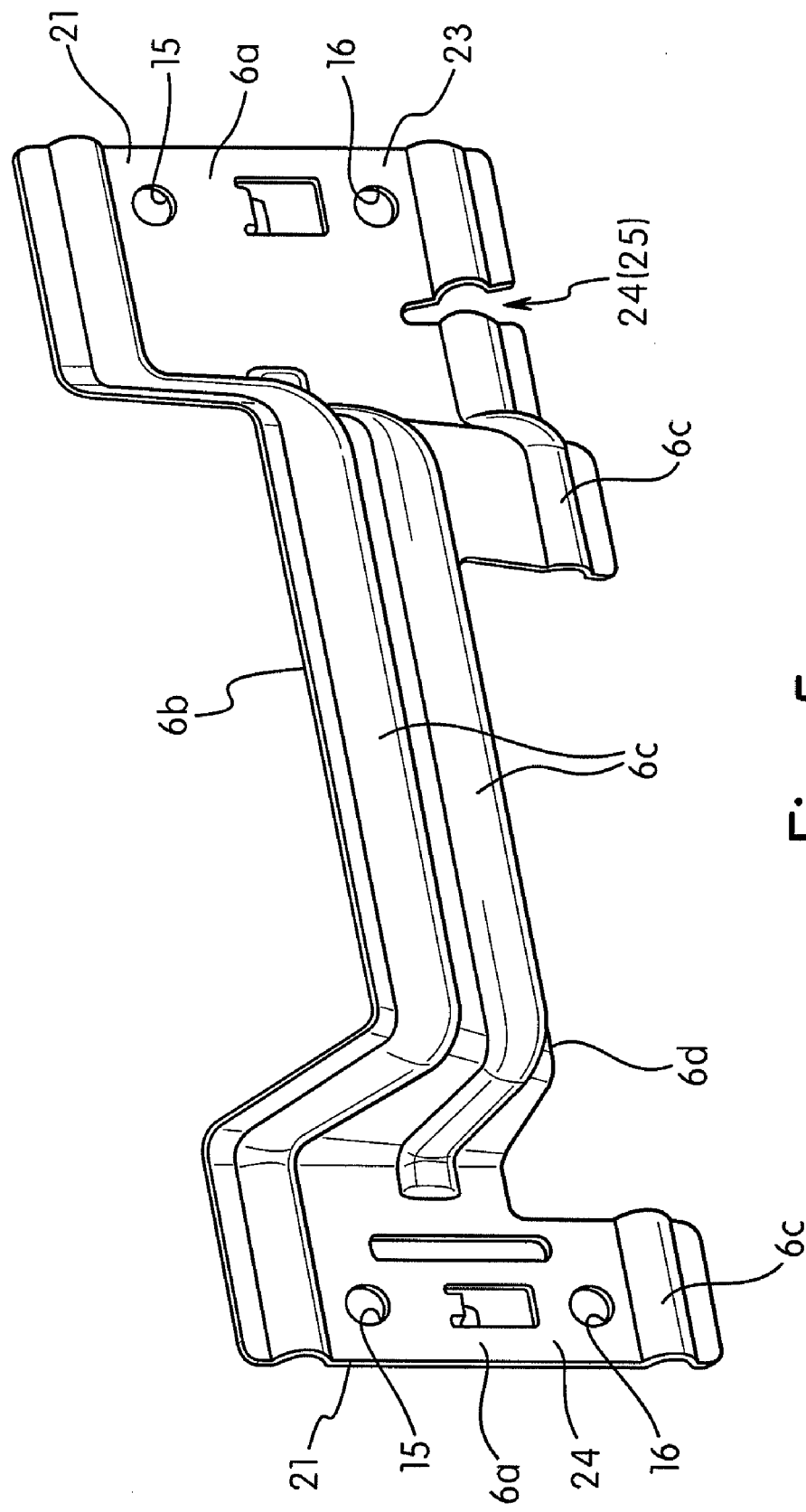
FIG. 5 is a perspective view of the knee bolster main body plate in accordance with a second embodiment of the present invention.

Alternatively, the knee bolster main body plate 6 can have a deformation load reducing structure 24 formed adjacent to the attachment mounting parts 6a that is opposite the cutout 6d, as shown in FIG. 5. In particular, the deformation load reducing structure 24 is formed at side parts (inside part) of the knee bolster main body plate 6 at a lower bracket attachment portion 23 (i.e., the upper parts of the attachment mounting parts 6a) for the rear end parts 4a of the upper impact absorbing brackets 4, as shown in FIG. 5.

Only one of either the deformation load reducing structure 22 or the deformation load reducing structure 24 is provided. The deformation load reducing structure 22 and the deformation load reducing structure 24 can be provided to two left and right locations or to one left and right location.

The deformation load reducing structures 22 and 24 are slit-shaped cutouts. The slit-shaped cutouts of the deformation load reducing structures 22 and 24 are formed, for example, to be oriented downward from the upper edge portion of the knee bolster main body plate 6 along the attachment mounting part 6a or along a boundary between the attachment mounting part 6a and the center part. The slit-shaped cutouts of the deformation load reducing structures 22 and 24 have a length that can divide at least one of the reinforcing bead parts 6c. The sides of the slit-shaped cutouts of the deformation load reducing structures 22 and 24 can be parallel or can be angled to form a V-shape with a narrow angle, as needed and/or desired.

An operation of the illustrated embodiment shall now be described. When the passenger's knees impact against the instrument panel P, the knee bolster main body plate 6 provided beneath the instrument panel P receives an impact force from the passenger's knees. This impact force from the passenger's knees is transferred to the impact absorbing structures 2, which then collapses if the impact force is above a prescribed impact deformation load threshold to absorb the energy acting upon the passenger's knees. In such an event, when the vehicle occupant has an average body type, the passenger's knees typically contact the instrument panel P at a high position on the knee bolster main body plate 6. The upper impact absorbing brackets 3 have a first prescribed impact deformation load threshold, while the first lower impact absorbing brackets 4 have a second prescribed impact deformation load threshold that is lower than the first prescribed impact deformation load threshold. Therefore, the upper impact absorbing brackets 3 primarily collapse with the lower impact absorbing brackets 4 also collapsing slightly, and the magnitude of the resulting receiving reaction force is thereby increased in comparison to deformation from the passenger's knees of a smaller body type contacting the instrument panel P. Conversely, when the vehicle occupant has a smaller body type, the passenger's knees typically contact the instrument panel P at a lower position lower on the knee bolster main body plate 6 than in the case of the average body type. Therefore, the lower impact absorbing bracket 4 primarily collapsed, and the resulting receiving reaction force is thereby decreased in comparison to deformation from the passenger's knees of an average body type contacting the instrument panel P.

Thus, the upper and lower impact absorbing brackets 3 and 4 serve different functions from each other so that the resulting receiving reaction force can be optimized in accordance with the body type of the passenger. In other words, a body-type-responsive function can be realized.

When the lower impact absorbing brackets 4 collapse from the impact force of the passenger's knees of a smaller body type, if the deformation load on the knee bolster main body plate 6 is high in instances where a portion of the knee bolster main body plate 6 is deformed, then the receiving reaction force will accordingly increase. In this situation, there will be a risk that the receiving reaction force on the passenger's knees of the smaller body type will exceed a desired set amount. Therefore, in the illustrated embodiment, the deformation load reducing structures 22 or 24 are provided to a side part (inside part) of the knee bolster main body plate 6 on the upper bracket attachment portions 21 for the rear end parts 3a of the upper impact absorbing brackets 3 or to the lower bracket attachment portion 23 for one of the rear end parts 4a of the lower impact absorbing brackets 4. Accordingly, the upper bracket attachment portions 21 or the lower bracket attachment portion 23 are partially cut off from other portions of the knee bolster main body plate 6. Also the load created by the deformation of the lower impact absorbing brackets 4 in relation to the partially cut off section of the upper bracket attachment portion 21 or the lower bracket attachment portion 23 is concentrated. The upper bracket attachment portions 21 is bent locally (for the first embodiment, refer to the imaginary lines in FIGS. 4). Therefore, the deformation load on the knee bolster main body plate 6 can be reduced when the lower impact absorbing brackets 4 are deformed.

Accordingly, it is possible solely for the receiving reaction force on the passenger's knees of a smaller body type to be made lower than the prevailing state with little effect being visited on the receiving reaction force on the passenger's knees of an average body type. In other words, the body-type-responsive function of the impact absorbing structures 2 can be made more specialized.

The deformation load reducing structures 22 and 24 are formed into, e.g., the slit-shaped cutout such that the deformation load reducing structures 22 and 24 can be readily formed by in an inexpensive manner and without adding a complicated process. The receiving reaction force can be set and adjusted in an uncomplicated manner by controlling the length (depth) of the slit-shaped cutout.

The deformation load reducing structures 22 and 24 are preferably formed into the slit-shaped cutout having a length that can divide one of the reinforcing bead parts 6c that is located near an edge of the knee bolster main body plate 6. Thus, the reinforcing effect created by the reinforcing bead part 6c is partially canceled and the deformation load on the upper bracket attachment portion 21 and the lower bracket attachment portion 23 can be securely reduced.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

While only selected embodiments have been chosen to illustrate the present invention, it will be apparent to those skilled in the art from this disclosure that various changes and modifications can be made herein without departing from the scope of the invention as defined in the appended claims. For embodiment, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An impact absorbing knee bolster comprising:
   an impact absorbing structure configured and arranged to be attached to a vehicle structural member, the impact absorbing structure including a pair of upper impact absorbing brackets having a first impact deformation load threshold and a pair of lower impact absorbing brackets having a second impact deformation load threshold that is lower than the first impact deformation load threshold; and
   a knee bolster main body plate including a pair of bracket attachment parts contacting rear end parts of the upper and lower impact absorbing brackets with a prescribed gap formed between the rear end parts of the upper and lower impact absorbing brackets,
   the knee bolster main body plate including a deformation load reducing structure disposed at a location adjacent at least one of the bracket attachment parts on an inner side of the at least one of the bracket attachment parts to reduce an impact deformation load threshold of the knee bolster main body plate so that a resulting receiving reaction force of the impact absorbing knee bolster is reduced when the lower impact absorbing brackets are deformed.

2. The impact absorbing knee bolster according to claim 1, wherein
   the knee bolster main body plate further includes an upper horizontally extending reinforcing bead part formed adjacent an upper edge portion of the knee bolster main body plate, and the deformation load reducing structure is a slit-shaped cutout that divides the upper horizontally extending reinforcing bead part.

3. The impact absorbing knee bolster according to claim 1, wherein the knee bolster main body plate further includes an upper horizontally extending reinforcing bead part formed adjacent an upper edge portion of the knee bolster main body plate, and the deformation load reducing structure includes a pair of slit-shaped cutouts that each divide the upper horizontally extending reinforcing bead part.

4. The impact absorbing knee bolster according to claim 3, wherein a lower edge portion of the knee bolster main body plate includes a cutout located between the bracket attachment parts, the cutout having a lateral width that is greater than or equal to one-half of an overall width of the knee bolster main body plate, and having a height that is less than or equal to one-half of the height of the knee bolster main body plate.

5. The impact absorbing knee bolster according to claim 1, wherein the knee bolster main body plate further includes a lower horizontally extending reinforcing bead part formed adjacent a lower edge portion of the knee bolster main body plate, and the deformation load reducing structure includes a slit-shaped cutout that divides the lower horizontally extending reinforcing bead part.

6. The impact absorbing knee bolster according to claim 5, wherein the lower edge portion of the knee bolster main body plate includes a cutout located between the bracket attachment parts, the cutout having a lateral width that is greater than or equal to one-half of an overall width of the knee bolster main body plate, and having a height that is less than or equal to one-half of the height of the knee bolster main body plate.

7. The impact absorbing knee bolster according to claim 1, wherein the knee bolster main body plate further includes a lower edge portion with a cutout located between the bracket attachment parts, the cutout having a lateral width that is greater than or equal to one-half of an overall width of the knee bolster main body plate, and having a height that is less than or equal to one-half of the height of the knee bolster main body plate.

8. The impact absorbing knee bolster according to claim 1, wherein the rear end parts of the upper and lower impact absorbing brackets that are located on a right end of the knee bolster main body plate are at least partially vertically aligned and the rear end parts of the upper and lower impact absorbing brackets that are located on a left end of the knee bolster main body plate are at least partially vertically aligned.

9. An impact absorbing knee bolster comprising:

upper impact absorbing means for absorbing an impact from a passenger's knee with a first impact deformation load threshold;

lower impact absorbing means for absorbing the impact from the passenger's knee with a second impact deformation load threshold that is lower than the first impact deformation load threshold, and the lower impact absorbing means being disposed at a lower vertical location than the upper impact absorbing means; and knee bolster main body means for transmitting the impact from the passenger's knee to the upper and lower impact absorbing means, the knee bolster main body means including deformation load reducing means disposed at a location adjacent at least one of attachment parts between the knee bolster main body means and one of the upper and lower impact absorbing means on an inner side of the at least one of the attachment parts for reducing the deformation load at a location adjacent at least one of the upper and lower impact absorbing means to reduce an impact deformation load threshold of the knee bolster main body means so that a resulting receiving reaction force of the impact absorbing knee bolster is reduced when the lower impact absorbing means deforms by the impact from the passenger's knee.

10. The impact absorbing knee bolster according to claim 1, wherein the deformation load reducing structure includes a slit-shaped cutout extending substantially vertically from at least one of an upper edge portion and a lower edge portion of the knee bolster main body plate.

11. The impact absorbing knee bolster according to claim 10, wherein the knee bolster main body plate further includes a horizontally extending reinforcing bead part, and the slit-shaped cutout of the deformation load reducing structure divides the horizontally extending reinforcing bead part.

* * * * *